(12) United States Patent
Yan

(10) Patent No.: US 11,381,552 B2
(45) Date of Patent: Jul. 5, 2022

(54) SERVICE PROVIDING METHOD AND APPARATUS AND ELECTRONIC DEVICE

(71) Applicant: BOE TECHNOLOGY GROUP CO., LTD., Beijing (CN)

(72) Inventor: Xinquan Yan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 127 days.

(21) Appl. No.: 16/829,078

(22) Filed: Mar. 25, 2020

(65) Prior Publication Data
US 2021/0029110 A1 Jan. 28, 2021

(30) Foreign Application Priority Data
Jul. 22, 2019 (CN) .......................... 201910662432.1

(51) Int. Cl.
H04L 29/06 (2006.01)
H04L 9/40 (2022.01)

(52) U.S. Cl.
CPC ........ H04L 63/0823 (2013.01); H04L 63/061 (2013.01); H04L 63/0815 (2013.01); H04L 63/10 (2013.01)

(58) Field of Classification Search
CPC ............. H04L 63/0823; H04L 63/061; H04L 63/0815; H04L 63/10
See application file for complete search history.

(56) References Cited

U.S. PATENT DOCUMENTS

| 9,665,854 B1* | 5/2017 | Burger .................... H04L 67/26 |
| 10,511,690 B1* | 12/2019 | Chatterjee ............... H04L 67/02 |
| 2016/0124742 A1* | 5/2016 | Rangasamy ........ H04L 41/0803 717/103 |
| 2018/0324173 A1* | 11/2018 | Ananthapur Bache ...................... H04L 63/0815 |
| 2019/0098106 A1* | 3/2019 | Mungel ............... H04L 67/2819 |
| 2019/0124504 A1* | 4/2019 | Tran ...................... H04W 8/183 |
| 2019/0220305 A1* | 7/2019 | Festa ..................... G06F 21/554 |
| 2020/0120000 A1* | 4/2020 | Parthasarathy ......... H04L 67/10 |

FOREIGN PATENT DOCUMENTS

CN 108446111 A 8/2018

OTHER PUBLICATIONS

Simioni and Vardanega, In Pursuit of Architectural Agility: Experimenting with Microservices, Univ. of Padua, Italy, Dept. of Mathematics, IEEE 2018. (Year: 2018).*

* cited by examiner

Primary Examiner — Vance M Little
(74) Attorney, Agent, or Firm — Westman, Champlin & Koehler, P.A.

(57) ABSTRACT

A service providing method comprises: receiving a microservice access request, which carries an identity authentication credential, transmitted by a client device; authenticating the client device's identity based on the identity authentication credential; determining a target microservice corresponding to the client device if the authentication of the client device's identity is successful; and providing the client device with the target microservice via a target application programming interface corresponding to the target microservice.

18 Claims, 4 Drawing Sheets

SERVICE PROVIDING METHOD AND APPARATUS AND ELECTRONIC DEVICE

CROSS-REFERENCE TO RELATED APPLICATION

This application claims a priority to Chinese Patent Application No. 201910662432.1 filed on Jul. 22, 2019, the disclosure of which is incorporated in its entirety by reference herein.

TECHNICAL FIELD

The present disclosure relates to the field of microservice processing technology, and in particular to a service providing method and apparatus, and an electronic device.

BACKGROUND

In recent years, a monolithic style of software architecture has become an obstacle that hinders the advancement of development and deployment of modern software due to its bloated codebase, low-quality functional interfaces, complex dependencies, fuzzy module functions, frequently changing research and development teams, and a continuously increasing number of bugs and great difficulty in expansion and maintenance. For these reasons, the development and expansion of a microservice system has been promoted. Microservices have gradually become mainstream methodologies and practical principles of development and delivery of modern software through fine-grained service division, clear functional boundaries, separate maintenance and deployment, and rapid expansion.

A microservice architecture (MSA) is opposed to the original large-scaled system, and is an architecture in which a large-scaled system is divided horizontally or vertically in terms of business or architecture into many fine-grained microservice modules, which results in a large number of loose microservice modules which are cross-linked, thereby causing the increase in the complexity of microservices and in the difficulty of managing microservices.

SUMMARY

In a first aspect, embodiments of the present disclosure provide a service providing method applied to a gateway system, including: receiving a microservice access request, which carries an identity authentication credential, transmitted by a client device; authenticating the client device's identity based on the identity authentication credential; determining a target microservice corresponding to the client device if the authentication of the client device's identity is successful; and providing the client device with the target microservice via a target application programming interface corresponding to the target microservice.

According to some possible embodiments of the present disclosure, prior to the receiving the microservice access request transmitted by the client device, the method further includes: receiving registration requests transmitted by a plurality of microservices, the registration requests including registration addresses of the microservices, and the target microservice being one of the plurality of microservices; configuring a corresponding application programming interface for each of the microservices based on a corresponding one of the registration requests, the target application programming interface being one of the application programming interfaces; and completing the registration of each of the microservices in the gateway system based on a corresponding one of the registration addresses and a corresponding one of the application programming interfaces.

According to some possible embodiments of the present disclosure, subsequent to the completing the registration of each of the microservices in the gateway system based on the corresponding one of the registration addresses and the corresponding one of the application programming interfaces, the method further includes: acquiring a service request for applying for a microservice transmitted by the client device via the target application programming interface; acquiring the target microservice corresponding to the target application programming interface; creating a gateway identity authentication credential corresponding to the client device, the gateway identity authentication credential including a public key and a private key assigned to the client device; transmitting the public key to the client device; and establishing and storing an association relationship between the target microservice and the private key.

According to some possible embodiments of the present disclosure, the identity authentication credential is a public key to be authenticated, and the authenticating the client device's identity based on the identity authentication credential includes: matching the public key to be authenticated and the private key which has been stored in advance to obtain a matching result; and authenticating the client device's identity based on the matching result.

According to some possible embodiments of the present disclosure, subsequent to the creating the gateway identity authentication credential corresponding to the client device, the method further includes setting a validity period of the gateway identity authentication credential; and the matching the public key to be authenticated and the private key which has been stored in advance to obtain the matching result includes determining whether the validity period of the gateway identity authentication credential has elapsed; and matching the public key to be authenticated and the private key which has been stored in advance to obtain the matching result if the validity period of the gateway identity authentication credential has not elapsed.

According to some possible embodiments of the present disclosure, the determining the target microservice corresponding to the client device includes determining the target microservice corresponding to the private key based on the association relationship.

According to some possible embodiments of the present disclosure, subsequent to the authenticating the client device's identity based on the identity authentication credential, the method further includes returning information indicating failed access to the client device if the authentication of the client device's identity fails.

According to some possible embodiments of the present disclosure, the gateway system is a Kong gateway system, which is an agent tool for managing application programming interfaces and microservices, developed based on Nginx using a lua scripting language.

According to some possible embodiments of the present disclosure, the registration address is a media access control (MAC) address of the microservice.

According to some possible embodiments of the present disclosure, the public key is a user name assigned by the gateway system to the client device, and the private key is a password assigned by the gateway system to the client device.

In a second aspect, embodiments of the present disclosure provide a gateway system including: an access request reception circuit configured to receive a microservice access request, which carries an identity authentication credential, transmitted by a client device; an identity authentication circuit configured to authenticate the client device's identity based on the identity authentication credential; a target service determination circuit configured to determine a target microservice corresponding to the client device if the authentication of the client device's identity is successful; and a target service provision circuit configured to provide the client device with the target microservice via a target application programming interface corresponding to the target microservice.

According to some possible embodiments of the present disclosure, the gateway system further includes: a registration request reception circuit configured to receive registration requests transmitted by a plurality of microservices, the registration requests including registration addresses of the microservices, and the target microservice being one of the plurality of microservices; a programming interface configuration circuit configured to configure a corresponding application programming interface for each of the microservices based on a corresponding one of the registration requests, the target application programming interface being one of the application programming interfaces; and a microservice registration circuit configured to complete the registration of each of the microservices in the gateway system based on a corresponding one of the registration addresses and a corresponding one of the application programming interfaces.

According to some possible embodiments of the present disclosure, the gateway system further includes: a service request acquisition circuit configured to acquire a service request for applying for a microservice transmitted by the client device via the target application programming interface; a target service acquisition circuit configured to acquire the target microservice corresponding to the target application programming interface; an authentication credential creation circuit configured to create a gateway identity authentication credential corresponding to the client device, the gateway identity authentication credential including a public key and a private key assigned to the client device; a public key transmission circuit configured to transmit the public key to the client device; and an association relationship establishment circuit configured to establish and store an association relationship between the target microservice and the private key.

According to some possible embodiments of the present disclosure, the identity authentication credential is a public key to be authenticated, and the identity authentication circuit includes: a first matching result acquisition sub-circuit configured to match the public key to be authenticated and the private key to obtain a matching result; and an identity authentication sub-circuit configured to authenticate the client device's identity based on the matching result.

According to some possible embodiments of the present disclosure, the gateway system further includes a validity period setting circuit configured to set a validity period of the gateway identity authentication credential; and the first matching result acquisition sub-circuit includes: a validity period determination sub-circuit configured to determine whether the validity period of the gateway identity authentication credential has elapsed; and a second matching result acquisition sub-circuit configured to match the public key to be authenticated and the private key which has been stored in advance to obtain the matching result if the validity period of the gateway identity authentication credential has not elapsed.

According to some possible embodiments of the present disclosure, the target service determination circuit includes a target service determination sub-circuit configured to determine the target microservice corresponding to the private key based on the association relationship.

According to some possible embodiments of the present disclosure, the gateway system includes an access failure information transmission circuit configured to return information indicating failed access to the client device if the authentication of the client device's identity fails.

According to some possible embodiments of the present disclosure, the gateway system is a Kong gateway system, which is an agent tool for managing application programming interfaces and microservices, developed based on Nginx using a lua scripting language.

According to some possible embodiments of the present disclosure, the registration address is a media access control (MAC) address of the microservice.

According to some possible embodiments of the present disclosure, the public key is a user name assigned by the gateway system to the client device, and the private key is a password assigned by the gateway system to the client device.

BRIEF DESCRIPTION OF THE DRAWINGS

In order to illustrate the technical solutions of the embodiments of the present disclosure more apparently, the accompanying drawings required in the description of the embodiments of the present disclosure will be briefly introduced below. It is evident that the drawings in the following description relate to only some embodiments of the present disclosure, and based on these drawings, the other drawings can be obtained by those of ordinary skill in the art without exercising any creative work.

DETAILED DESCRIPTION

In order to make the foregoing objectives, features, and advantages of the present disclosure become evident, the present disclosure will be described in greater detail hereinafter with reference to the accompanying drawings and specific embodiments.

Figure 1:
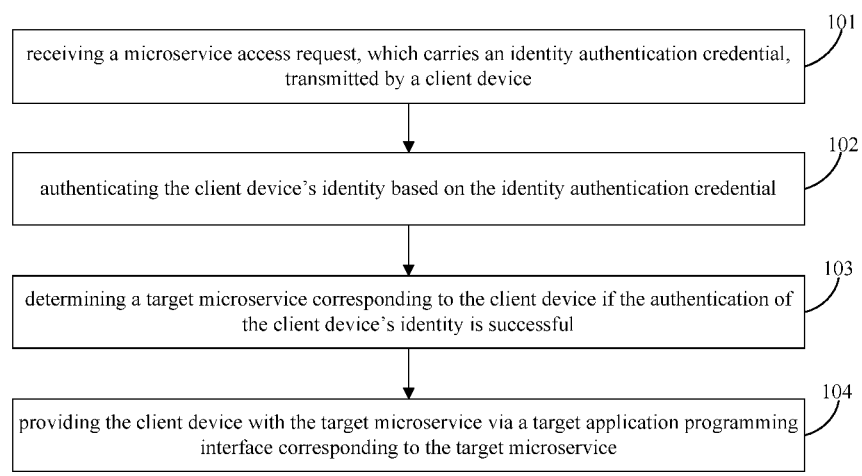
FIG. 1 shows a first flowchart of steps in a service providing method provided in an embodiment of the present disclosure.

Referring to FIG. 1, a flowchart of steps in a service providing method provided in an embodiment of the present disclosure is shown. The service providing method can be applied to a gateway system, and specifically include the following steps.

In step 101, a microservice access request, which carries an identity authentication credential, transmitted by a client device is received.

In the embodiment of the present disclosure, the gateway system refers to a system for managing microservices.

In this disclosure, the gateway system is preferably a Kong gateway system, which is an agent tool for managing application programming interfaces (APIs) and microservices, developed based on Nginx using a lua scripting language.

A microservice architecture is an emerging software architecture in which a large-scaled single application and service is split into dozens of supported microservices. A strategy of microservices can make work easier and expand a single component rather than an entire application stack, so as to meet the service level agreement.

The microservices for individual applications (APPs) can be registered in the gateway system in advance, and a corresponding API is configured by the gateway system for each microservice, so that the client device can access the microservices registered in the gateway system via the APIs.

The microservice access request is an access request initiated by the client device for accessing the microservice registered in the gateway system in advance.

The microservice access request carries the identity authentication credential, which is a credential for authenticating the identity of the client device. It can be understood that if a client device wants to access a microservice registered in the gateway system, it is required to apply for the microservice in the gateway system in advance and complete the registration of the client device in the gateway system, so that the gateway system provides the client device with an authentication credential. Then, the client device can generate a microservice access request carrying an identity authentication credential based on the authentication credential, and the client device's identity can be authenticated by the gateway system based on the identity authentication credential.

The process of generating the identity authentication credential will be described in detail in the following method embodiments, and the embodiments of the present disclosure are not limited thereto.

After the microservice access request transmitted by the client device has been received, step 102 is performed.

In step 102, the client device's identity is authenticated based on the identity authentication credential.

The gateway system provides the client device with the authentication credential in advance, and can store this authentication credential and transmit it to the client device. The microservice access request initiated by the client device carries an authentication credential, and after receiving the microservice access request transmitted by the client device, the gateway system can match the identity authentication credential carried in the microservice access request and the authentication credentials stored in the system and thus authenticate the identity of the client device.

It can be understood that the above method for identity authentication is merely one authentication solution enumerated for a better understanding of the solutions of the present disclosure, and in specific implementations, other methods for identity authentication may be adopted, and this is not limited in the embodiments of the present disclosure.

After authenticating the client device's identity based on the identity authentication credential, step 103 is performed.

In step 103, if the authentication of the client device's identity is successful, a target microservice corresponding to the client device is determined.

However, if the authentication of the client device's identity fails, information indicating failed access can be returned to the client device to prompt the client device to apply for the microservice in advance, that is, to register in the gateway system in advance, and a corresponding microservice can be assigned by the gateway system to the client device.

The target microservice refers to the microservice that the client device applies for in the gateway system in advance. While the client device is registered in the gateway system, the gateway system can also assign the corresponding microservice, that is, the target microservice, to the client device according to an API accessed by the client device, and establish an association relationship between the client device and the target microservice. When the client device accesses the microservice again, the target microservice can be provided directly to the client device.

In the case where the client device's identity is successfully authenticated, the target microservice can be determined based on the association relationship between the client device and the target microservice which has been stored in the gateway system in advance.

After determining the target microservice corresponding to the client device, step 104 is performed.

In step 104, the client device is provided with the target microservice via a target application programming interface corresponding to the target microservice.

The target application programming interface (the target API) is an API corresponding to the target microservice, and each microservice corresponds to a unique API in the gateway system. A microservice can be provided to the client device through a corresponding API.

After the target microservice corresponding to the client device has been determined, a target API corresponding to the target microservice can be acquired, and the target microservice can be provided to the client device via the target API.

The embodiments of the present disclosure provide unified management of the microservices through the gateway system, and are capable of enabling corresponding microservices to be provided based on the identity authentication credentials of the authorized client devices.

The service providing method provided in the embodiments of the present disclosure includes: receiving the microservice access request, which carries the identity authentication credential, transmitted by the client device; authenticating the client device's identity based on the identity authentication credential; determining the target microservice corresponding to the client device if the authentication of the client device's identity is successful; and providing the client device with the target microservice via the target application programming interface corresponding to the target microservice. The embodiments of the present disclosure provide unified management of the microservices through the gateway system, and are capable of enabling corresponding microservices to be provided based on the identity authentication credentials of the authorized client devices, thereby reducing the difficulty of managing the microservices.

Figure 2:
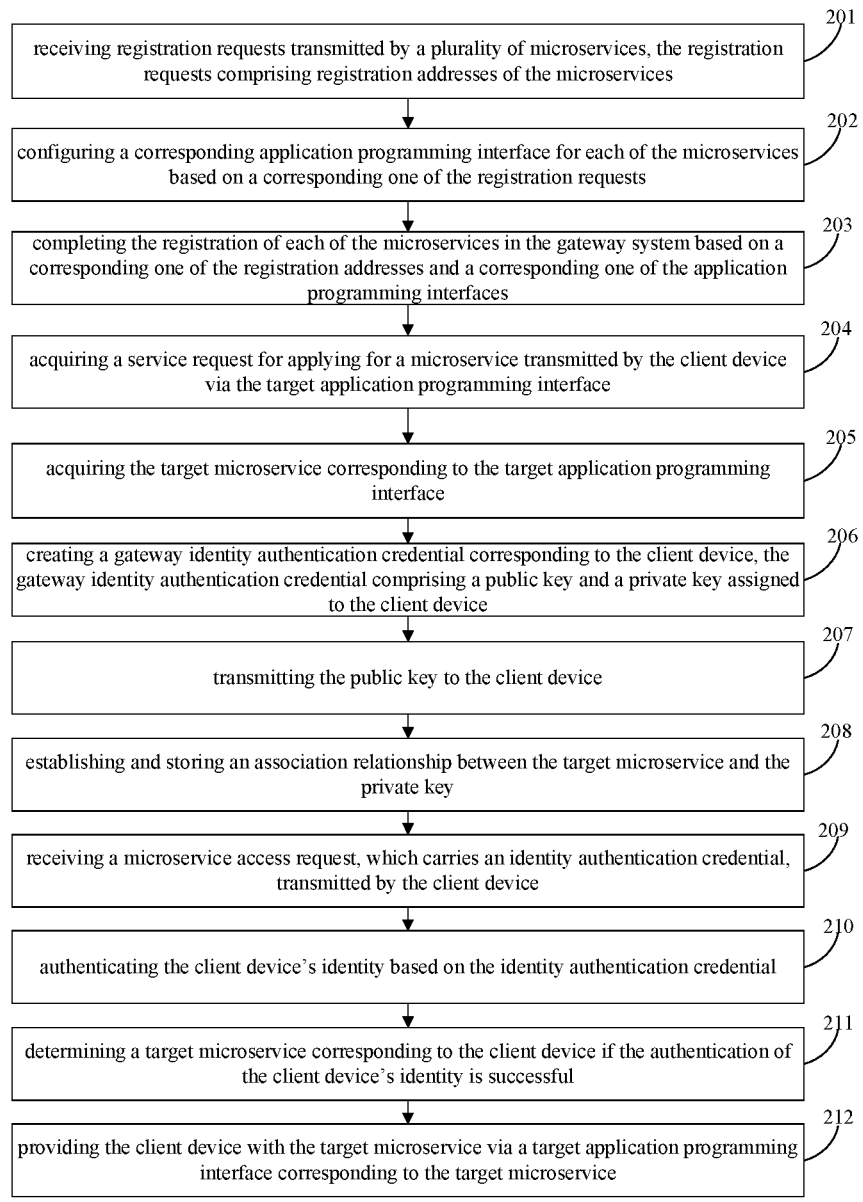
FIG. 2 shows a second flowchart of steps in a service providing method provided in another embodiment of the present disclosure.

Referring to FIG. 2, a flowchart of steps of a service providing method provided in another embodiment of the present disclosure is shown. The service providing method can be applied to a gateway system, and specifically include the following steps.

In step 201, registration requests transmitted by a plurality of microservices are received. The registration request includes a registration address of the microservice.

The gate system is a system for managing the microservices.

In this disclosure, the gateway system is preferably a Kong gateway system, which is an agent tool for managing application programming interfaces (APIs) and microservices, developed based on Nginx using a lua scripting language.

A microservice architecture is an emerging software architecture in which a large-scaled single application and service is split into dozens of supported microservices. A strategy of microservices can make work easier and expand a single component rather than an entire application stack, so as to meet the service level agreement.

It can be understood that the target microservice mentioned in the following steps is one of the plurality of microservices registered in the gate system.

The registration request is a request for service registration transmitted by the microservice to the gateway system when the microservice needs to be registered in the gateway system.

The registration address refers to the address of the microservice. For example, the microservice can be quickly obtained based on a media access control (MAC) address where the microservce is so as to provide the client device with a corresponding service.

When the microservice needs to be registered in the gateway system, it can generate a registration request in combination with the corresponding registration address, and send the registration request to the gateway system.

After the gateway system receives the registration requests transmitted by the plurality of microservices, step 202 is performed.

In step 202, a corresponding application programming interface is configured for each of the microservices based on a corresponding one of the registration requests.

The application programming interface is an interface for providing the microservice.

After the gateway system has received the registration requests transmitted by the plurality of microservices, a corresponding application programming interface (API) can be configured for each of the microservices, that is, each microservice in the gateway system corresponds to a unique API. For example, the microservices registered in the gateway system in advance include Service 1, Service 2 and Service 3, and the API corresponding to Service 1 is APIa, the API corresponding to Service 2 is APIb, and the API corresponding to Service 3 is APIc.

It can be understood that the target API mentioned in the following steps is one of the plurality of APIs.

In the gateway system, correspondence relations between the microservices and the APIs as described above can be stored, for example, in the form of a list as shown in Table 1 below.

TABLE 1

| microservices | API |
|---|---|
| Service 1 | APIa |
| Service 2 | APIb |
| Service 3 | APIc |

Of course, in a specific implementation, the correspondence relations between the microservices and the APIs may be stored in the form of a database list. The way to store the correspondence relations between the microservices and the APIs can be determined according to an actual situation, and is not limited in the embodiments of the present disclosure.

It can be understood that the foregoing examples are merely examples enumerated for a better understanding of the technical solutions of the embodiments of the present disclosure, and are not intended to limit the embodiments of the present disclosure thereto.

After receiving the registration requests transmitted by the plurality of microservices, the gateway system can configure one API for each of the microservices.

After the gateway system has configured the corresponding application programming interface for each of the microservices based on a corresponding one of the registration requests, step 203 is performed.

In step 203, the registration of each microservice in the gateway system is completed based on a corresponding one of the registration addresses and a corresponding one of the application programming interfaces.

After the gateway system has configured the corresponding API for each of the microservices, it can complete the registration of each microservice in the gateway system based on the registration address corresponding to the microservice and the API corresponding to the microservice.

After the registration of each microservice in the gateway system has been completed, the client device can directly access the gateway system when accessing a microservice, the gateway system provides the corresponding API, and the microservice can provide the client device with the corresponding service via this API. For example, the microservices registered in the gateway system include Service a and Service b, and the API corresponding to Service a is API2 and the API corresponding to Service b is API3. When the client device needs to access Service b, it can access the gateway system via the API3, and the gateway system notifies Service b to provide the service to the client device via the API3.

It can be understood that the foregoing examples are merely examples enumerated for a better understanding of the technical solutions of the embodiments of the present disclosure, and are not intended to limit the embodiments of the present disclosure thereto.

After the registration of each microservice in the gateway system has been completed based on the corresponding one of the registration addresses and the corresponding one of the application programming interfaces, step 204 is performed.

In step 204, a service request for applying for a microservice transmitted by the client device via the target application programming interface is acquired.

The target application programming interface (the target API) is an API corresponding to the microservice for which the client device needs to apply.

When a client device accesses a microservice, an application for the microservice can be transmitted to the gateway system in advance. The service request refers to a request initiated by the client device for applying for the microservice.

When a client device initiates an application for a microservice, a service request for applying for the microservice can be transmitted to the gateway system via an API corresponding to the microservice. For example, the microservices registered in the gateway system include Service a and Service b, and the API corresponding to Service a is API2 and the API corresponding to Service b is API3. When the client device needs to apply for Service a, it can transmit a service request for applying for Service a to the gateway system via the API2. When the client device applies for Service b, it can send a service request for applying for Service b to the gateway system via the API3.

It can be understood that the foregoing examples are merely examples enumerated for a better understanding of the technical solutions of the embodiments of the present disclosure, and are not intended to limit the embodiments of the present disclosure thereto.

When the client device transmits the service request for applying for the microservice to the gateway system, the client device does not know the API corresponding to the microservice to be applied for. Therefore, when the client device transmits the service request to the gateway system, it can add descriptive information of the microservice to be applied for, such as the type of the microservice and what functions it provides, and then a corresponding API can be automatically assigned by the gateway system to the service request transmitted by the client device based on the descriptive information of the microservice.

Of course, in addition, when the client device needs to apply for a microservice in the gateway system, the gateway system can provide a list of microservices to the client device, which clearly indicates the microservices, their descriptive information and their corresponding APIs. Thus, the client device can choose a corresponding microservice and its corresponding API, and transmits a corresponding service request for applying for the microservice to the gateway system via this corresponding API.

In actual applications, the API via which the client device transmits the service request can be determined by using other methods. Specifically, the API may be determined according to business requirements, and the embodiments of the present disclosure are not limited thereto.

After the service application for applying for the microservice transmitted by the client device via the target application programming interface has been acquired, step 205 is performed.

In step 205, the target microservice corresponding to the target application programming interface is acquired.

The target microservice refers to the target microservice corresponding to the target API.

After the client device has transmitted the service request for applying for the microservice to the gateway system via the target API, the corresponding target microservice can be acquired according to the target API. For example, the microservices registered in the gateway system in advance include Service 1 and Service 2, and the API corresponding to Service 1 is API1, and the API corresponding to Service 2 is API2. When the client device transmits a service request for applying for a microservice via the API1, the target API is the API1 and the target microservice is Service 1. When the client device transmits a service request for applying for a microservice via the API2, the target API is the API2 and the target microservice is Service 2.

It can be understood that the foregoing examples are merely examples enumerated for a better understanding of the technical solutions of the embodiments of the present disclosure, and are not intended to limit the embodiments of the present disclosure thereto.

After the gateway system has acquired the target microservice corresponding to the target API, step 206 is performed.

In step 206, a gateway identity authentication credential corresponding to the client device is created. The gateway identity authentication credential includes a public key and a private key assigned to the client device.

The gateway identity authentication credential is a credential created by the gateway system for authenticating the client device's identity.

The gateway identity authentication credential can include a public key and a private key assigned by the gateway system to the client device. The public key is equivalent to a user name assigned by the gateway system to the client device, and the private key is equivalent to a password assigned by the gateway system to the client device, and the registration of the client device in the gateway system can be completed by using the user name and the password.

For each client device, the public and private keys match each other and exist in pairs. For example, the client devices registered in the gateway system in advance include Client device a and Client device b, and the public and private keys in the gateway identity authentication credential corresponding to Client device a are respectively public key 1 and private key 1, which match each other. In addition, the public and private keys in the gateway identity authentication credential corresponding to Client device b are respectively public key 2 and private key 2, which match each other.

It can be understood that the foregoing examples are merely examples enumerated for a better understanding of the technical solutions of the embodiments of the present disclosure, and are not intended to limit the embodiments of the present disclosure thereto.

After the gateway system has acquired the target microservice corresponding to the target API, a gateway identity authentication credential corresponding to the client device can be also created by the gateway system, and then step 207 is performed.

In step 207, the public key is transmitted to the client device.

After the gateway system has created the gateway identity authentication credential corresponding to the client device, the public key in the gateway identity authentication credential can be transmitted by the gateway system to the client device.

After the gateway system has transmitted the public key to the client device, step 208 is performed.

In step 208, an association relationship between the target microservice and the private key is established and stored.

After the gateway system has transmitted the public key in the gateway identity authentication credential to the client device, the private key in the gateway identity authentication credential can be stored in a local gateway system.

The association relationship between the private key stored by the gateway system and the target microservice can be established by combining the target microservice applied for by the client device and the private and public keys assigned by the gateway system to the client device. For example, if the microservice applied for by Client device a is Service 1 and the private key assigned to Client device a is Private key 1, then an association relationship between Service 1 and Private key 1 can be established. In addition, if the microservice applied for by Client device b is Service 2 and the private key assigned to Client device b is Private key 2, then an association relationship between Service 2 and Private key 2 can be established. For another example, if the microservice applied for by Client device c is Service 3 and the private key assigned to Client device c is Private key 3, then an association relationship between Service 3 and Private key 3 can be established.

After the association relationship between the private key and the target microservice has been established, the association relationship can be stored in the gateway system, for example, in the form of a list. For example, the storing method for the above example can be shown in Table 2 below.

TABLE 2

| microservices | private key |
| --- | --- |
| Service 1 | Private key 1 |
| Service 2 | Private key 2 |
| Service 3 | Private key 3 |

As can be known from the above Table 2, there is an association relationship between Service 1 and Private key 1, an association relationship between Service 2 and Private key 2, and an association relationship between Service 3 and Private key 3.

Of course, the association relationships between the microservices and the private keys may be stored in the gateway system in another form, such as in the form of a database list. Specifically, it can be determined according to business requirements, and the embodiments of the present disclosure are not limited thereto.

It can be understood that the foregoing examples are merely examples enumerated for a better understanding of the technical solutions of the embodiments of the present disclosure, and are not intended to limit the embodiments of the present disclosure thereto.

After the association relationship between the target microservice and the private key has been established and stored, step 209 is performed.

In step 209, a microservice access request, which carries an identity authentication credential, transmitted by a client device is received.

The microservice access request is an access request initiated by the client device for accessing the microservice registered in the gateway system in advance.

The microservice access request carries the identity authentication credential, which is a credential for authenticating the identity of the client device. It can be understood that if a client device wants to access a microservice registered in the gateway system, it is required to apply for the microservice in the gateway system in advance and complete the registration of the client device in the gateway system, so that the gateway system provides the client device with an authentication credential. Then, the client device can generate a microservice access request carrying an identity authentication credential based on the authentication credential, and the client device's identity can be authenticated by the gateway system based on the identity authentication credential.

The process of the identity authentication will be described in detail in the following step 210.

After the microservice access request transmitted by the client device has been received, step 210 is performed.

In step 210, the client device's identity is authenticated based on the identity authentication credential.

The gateway system provides the client device with the authentication credential in advance, and can store this authentication credential and transmit it to the client device. The microservice access request initiated by the client device carries an authentication credential, and after receiving the microservice access request transmitted by the client device, the gateway system can match the identity authentication credential carried in the microservice access request and the authentication credentials stored in the system and thus authenticate the identity of the client device.

When the client device generates a microservice access request, it can generate the microservice access request by combining the public key transmitted by the gateway system. For example, after the client device obtains its corresponding public key, it can select a digest encryption algorithm based on the Json web token (JWT) protocol to generate the client device's JWT credential.

The identity authentication credential carried in the generated microservice access request is a public key to be authenticated. For the authentication process, reference may be made to the description of the following specific implementation.

In a specific implementation of the present disclosure, the above step 210 may include a sub-step A1 in which the private key stored in advance is matched with the public key to be authenticated to obtain a matching result, and a sub-step A2 in which the identity of the client device is authenticated based on the matching result.

In the embodiments of the present disclosure, the private key in the gateway authentication credential corresponding to the client device has been stored in the gateway system in advance, and after the client device generates the microservice access request (the microservice access request carries the public key to be authenticated) based on the public key in the gateway authentication credential issued by the gateway system, the private key stored in the gateway system can be matched with the public key to be authenticated to obtain the matching result.

When the matching result indicates that the match fails, which means that the client device has not registered in the gateway system in advance, then a message that the access to the target microservice has failed is transmitted to the client device, and the client device is notified to complete the registration in the gateway system and apply for the corresponding target microservice.

When the matching result indicates that the match is successful, it means that the authentication of the client device's identity is successful, that is, the client device has registered in the gateway system in advance and applied for the target microservice.

Of course, a corresponding validity period is further set for the gateway identity authentication credential created by the gateway system for the client device. For example, a validity period is one month, the starting time is Jul. 11, 2019, and an expiration date is Aug. 11, 2019.

When matching the private key which has been stored in advance with the public key to be authenticated, it is also necessary to verify whether the validity period of the gateway identity authentication credential has elapsed. Specifically, it will be described in detail in the following specific implementation.

In another specific implementation of the present disclosure, the sub-step A1 may include a sub-step B1 in which whether the validity period of the gateway identity authentication credential has elapsed is determined, and a sub-step B2 in which the public key to be authenticated and the private key are matched to obtain the matching result if the validity period of the gateway identity authentication credential has not elapsed.

In the embodiment of the present disclosure, it is necessary to determine whether the validity period of the gateway identity authentication credential has elapsed before the gateway system matches the public key to be authenticated by using the private key stored in advance.

If the validity period of the gateway identity authentication credential has elapsed, the gateway system can transmit a reminder that the authentication credential have expired to the client device to prompt the client device to initiate a service request for applying for the microservice to the gateway system again, and the gateway system will re-create a new gateway authentication credential for the client device.

If the validity period of the gateway identity authentication credential has not elapsed, the gateway system can use the private key stored in advance to match the public key to be authenticated so as to obtain a corresponding matching result.

After the client device's identity has been authenticated based on the identity authentication credential, step 211 is performed.

In step 211, a target microservice corresponding to the client device is determined if the authentication of the client device's identity is successful.

However, if the authentication of the client device's identity fails, information indicating failed access can be returned to the client device to prompt the client device to apply for the microservice in advance, that is, to register in the gateway system in advance, and a corresponding microservice can be assigned by the gateway system to the client device.

The target microservice refers to the microservice that the client device applies for in the gateway system in advance. While the client device is registered in the gateway system, the gateway system can also assign the corresponding microservice, that is, the target microservice, to the client device according to an API accessed by the client device, and establish an association relationship between the client device and the target microservice. When the client device accesses the microservice again, the target microservice can be provided directly to the client device.

It can be understood that the association relationship between the client device and the target microservice is the association relationship between the private key corresponding to the client device and the target microservice established in the above step. After the private key corresponding to the client device is determined according to the above matching result, the target microservice corresponding to the private key can be determined according to the association relationship between the private key and the target microservice.

In the case where the client device's identity is successfully authenticated, the target microservice can be determined based on the association relationship between the client device and the target microservice stored in the gateway system in advance.

After the target microservice corresponding to the client device has been determined, step 212 is performed.

In step 212, the target microservice is provided to the client device via a target application programming interface corresponding to the target microservice.

The target application programming interface (the target API) is an API corresponding to the target microservice, and each microservice corresponds to a unique API in the gateway system. A microservice can be provided to the client device via a corresponding API.

After the target microservice corresponding to the client device has been determined, a target API corresponding to the target microservice can be acquired, and the target microservice can be provided to the client device via the target API.

The embodiments of the present disclosure provide unified management of the microservices through the gateway system, and are capable of enabling corresponding microservices to be provided based on the identity authentication credentials of the authorized client devices The service providing method provided in the embodiments of the present disclosure includes: receiving the microservice access request, which carries the identity authentication credential, transmitted by the client device; authenticating the client device's identity based on the identity authentication credential; determining the target microservice corresponding to the client device if the authentication of the client device's identity is successful; and providing the client device with the target microservice via the target application programming interface corresponding to the target microservice. The embodiments of the present disclosure provide unified management of the microservices through the gateway system, and are capable of enabling corresponding microservices to be provided based on the identity authentication credentials of the authorized client devices, thereby reducing the difficulty of managing the microservices.

Figure 3:
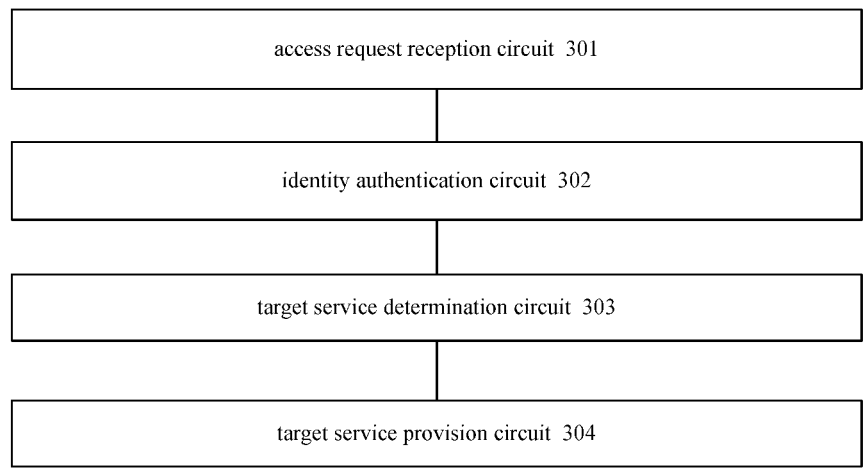
FIG. 3 shows a first schematic structural diagram of a service providing apparatus provided in an embodiment of the present disclosure.

Referring to FIG. 3, a schematic structural diagram of a service providing apparatus provided in an embodiment of the present disclosure is shown. The service providing apparatus can be applied to a gate system and specifically include the following circuits:

an access request reception circuit 301 configured to receive a microservice access request, which carries an identity authentication credential, transmitted by a client device;

an identity authentication circuit 302 configured to authenticate the client device's identity based on the identity authentication credential;

a target service determination circuit 303 configured to determine a target microservice corresponding to the client device if the authentication of the client device's identity is successful; and a target service provision circuit 304 configured to provide the client device with the target microservice via a target application programming interface corresponding to the target microservice.

The service providing apparatus provided in the embodiment of the present disclosure receives the microservice access request, which carries the identity authentication credential, transmitted by the client device, authenticates the client device's identity based on the identity authentication credential, determines the target microservice corresponding to the client device if the authentication of the client device's identity is successful, and provides the client device with the target microservice via the target application programming interface corresponding to the target microservice. The embodiments of the present disclosure provide unified management of the microservices through the gateway system, and are capable of enabling corresponding microservices to be provided based on the identity authentication credentials of the authorized client devices, thereby reducing the difficulty of managing the microservices.

Figure 4:
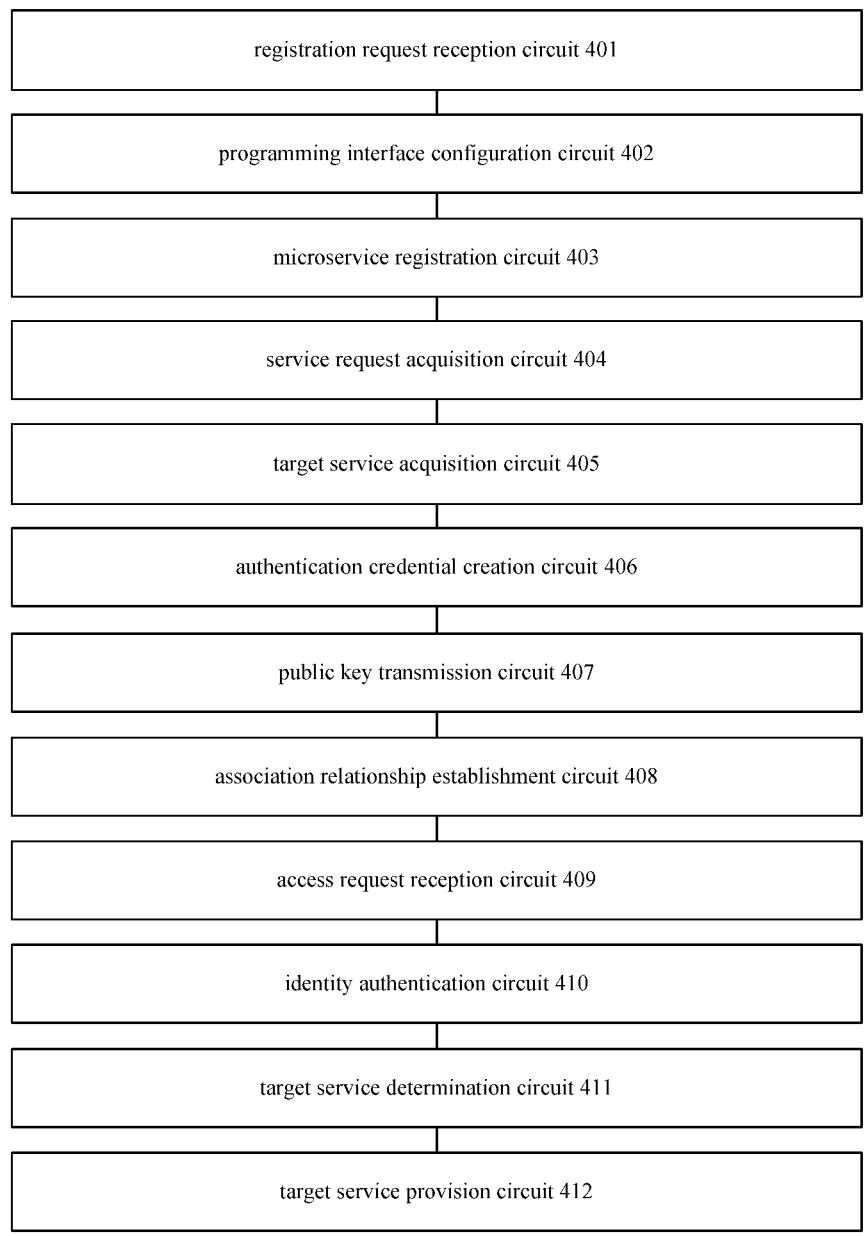
FIG. 4 shows a second schematic structural diagram of a service providing apparatus provided in another embodiment of the present disclosure.

Referring to FIG. 4, a schematic structural diagram of the service providing apparatus provided in the embodiment of the present disclosure is shown. The service providing apparatus can be applied to a gate system and specifically include the following circuits:

a registration request reception circuit 401 configured to receive registration requests transmitted by a plurality of microservices, the registration requests including registration addresses of the microservices, and the target microservice being one of the plurality of microservices;

a programming interface configuration circuit 402 configured to configure a corresponding application programming interface for each of the microservices based on a corresponding one of the registration requests, the target application programming interface being one of the application programming interfaces;

a microservice registration circuit 403 configured to complete the registration of each of the microservices in the gateway system based on a corresponding one of the registration addresses and a corresponding one of the application programming interfaces;

a service request acquisition circuit 404 configured to acquire a service request for applying for a microservice transmitted by the client device via the target application programming interface;

a target service acquisition circuit 405 configured to acquire the target microservice corresponding to the target application programming interface;

an authentication credential creation circuit 406 configured to create a gateway identity authentication credential corresponding to the client device, the gateway identity authentication credential including a public key and a private key assigned to the client device;

a public key transmission circuit 407 configured to transmit the public key to the client device;

an association relationship establishment circuit 408 configured to establish and store an association relationship between the target microservice and the private key;

an access request reception circuit 409 configured to receive a microservice access request, which carries an identity authentication credential, transmitted by a client device;

an identity authentication circuit 410 configured to authenticate the client device's identity based on the identity authentication credential;

a target service determination circuit 411 configured to determine a target microservice corresponding to the client device if the authentication of the client device's identity is successful; and a target service provision circuit 412 configured to provide the client device with the target microservice via a target application programming interface corresponding to the target microservice.

Optionally, the identity authentication credential is a public key to be authenticated, and the identity authentication circuit 410 includes: a first matching result acquisition sub-circuit configured to match the public key to be authenticated and the private key to obtain a matching result; and an identity authentication sub-circuit configured to authenticate the client device's identity based on the matching result.

Optionally, the service providing apparatus further includes a validity period setting circuit configured to set a validity period of the gateway identity authentication credential. The first matching result acquisition sub-circuit includes: a validity period determination sub-circuit configured to determine whether the validity period of the gateway identity authentication credential has elapsed; and a second matching result acquisition sub-circuit configured to match the public key to be authenticated and the private key to obtain the matching result if the validity period of the gateway identity authentication credential has not elapsed.

Optionally, the target service determination circuit 411 includes a target service determination sub-circuit configured to determine the target microservice corresponding to the private key based on the association relationship.

The service providing apparatus provided in the embodiment of the present disclosure receives the microservice access request, which carries the identity authentication credential, transmitted by the client device, authenticates the client device's identity based on the identity authentication credential, determines the target microservice corresponding to the client device if the authentication of the client device's identity is successful, and provides the client device with the target microservice via the target application programming interface corresponding to the target microservice. The embodiments of the present disclosure provide unified management of the microservices through the gateway system, and are capable of enabling corresponding microservices to be provided based on the identity authentication credentials of the authorized client devices, thereby reducing the difficulty of managing the microservices.

In another embodiment of the present disclosure, an electronic device is further provided, which includes a processor, a memory and a computer program stored on the memory and executable on the processor. When the processor executes the program, the service providing method of any one of the above embodiments is realized.

The embodiments in this specification are described in a progressive manner. Each embodiment focuses on the differences from the other embodiments, and the various embodiments can be referred to each other for identical or similar parts between them.

Finally, it also should be indicated that relational terms such as first and second herein are used only to discriminate one entity or operation from another entity or operation rather than to necessarily require or imply the actual existence of any relation or sequence between these entities or operations. Moreover, the terms "comprising" "including" or any other similar variety are intended to be non-exclusive, so that the processes, methods, items or equipments comprising a series of factors shall encompass not only the factors described herein but also other factors that are not listed explicitly, or further encompass the inherent factors of these processes, methods, items or equipments. Without more restrictions, an element defined by the wording "comprising one . . . " shall not exclude any other same factor in the processes, methods, items or equipments comprising the factor described herein.

In the foregoing, a service providing method, a service providing apparatus, and an electronic device provided by the present disclosure have been described in detail. The principle and embodiments of the present disclosure have been described herein by using specific examples. The description of the embodiments is only used to help understand the method of the disclosure and its core ideas; meanwhile, for a person of ordinary skill in the art, there will be changes in the specific implementation and the scope of application based on the ideas of the disclosure. To sum up, the contents of this specification should not be construed as a limitation of the present disclosure.

What is claimed is:

1. A service providing method applied to a gateway system, comprising:

receiving a microservice access request, which carries an identity authentication credential, transmitted by a client device;

authenticating the client device's identity based on the identity authentication credential;

determining a target microservice corresponding to the client device if the authentication of the client device's identity is successful; and providing the client device with the target microservice via a target application programming interface corresponding to the target microservice, wherein prior to the receiving the microservice access request transmitted by the client device, the method further comprises:

receiving registration requests transmitted by a plurality of microservices, the registration requests comprising registration addresses of the microservices, and the target microservice being one of the plurality of microservices;

configuring a corresponding application programming interface for each of the microservices based on a corresponding one of the registration requests, the target application programming interface being one of the application programming interfaces; and completing the registration of each of the microservices in the gateway system based on a corresponding one of the registration addresses and a corresponding one of the application programming interfaces.

2. The method according to claim 1, wherein subsequent to the completing the registration of each of the microservices in the gateway system based on the corresponding one of the registration addresses and the corresponding one of the application programming interfaces, the method further comprises:

acquiring a service request for applying for a microservice transmitted by the client device via the target application programming interface;

acquiring the target microservice corresponding to the target application programming interface;

creating a gateway identity authentication credential corresponding to the client device, the gateway identity authentication credential comprising a public key and a private key assigned to the client device;

transmitting the public key to the client device; and establishing and storing an association relationship between the target microservice and the private key.

3. The method according to claim 2, wherein the identity authentication credential is a public key to be authenticated, and the authenticating the client device's identity based on the identity authentication credential comprises:

matching the public key to be authenticated and the private key which has been stored in advance to obtain a matching result; and authenticating the client device's identity based on the matching result.

4. The method according to claim 3, wherein subsequent to the creating the gateway identity authentication credential corresponding to the client device, the method further comprises setting a validity period of the gateway identity authentication credential; and the matching the public key to be authenticated and the private key which has been stored in advance to obtain the matching result comprises:

determining whether the validity period of the gateway identity authentication credential has elapsed; and matching the public key to be authenticated and the private key which has been stored in advance to obtain the matching result if the validity period of the gateway identity authentication credential has not elapsed.

5. The method according to claim 2, wherein the determining the target microservice corresponding to the client device comprises determining the target microservice corresponding to the private key based on the association relationship.

6. The method according to claim 1, wherein subsequent to the authenticating the client device's identity based on the identity authentication credential, the method further comprises returning information indicating failed access to the client device if the authentication of the client device's identity fails.

7. The method according to claim 1, wherein the gateway system is a Kong gateway system, which is an agent tool for managing application programming interfaces and microservices, developed based on Nginx using a lua scripting language.

8. The method according to claim 1, wherein the registration address is a media access control (MAC) address of the microservice.

9. The method according to claim 1, wherein the public key is a user name assigned by the gateway system to the client device, and the private key is a password assigned by the gateway system to the client device.

10. A gateway system, comprising:

an access request reception circuit, configured to receive a microservice access request, which carries an identity authentication credential, transmitted by a client device;

an identity authentication circuit, configured to authenticate the client device's identity based on the identity authentication credential;

a target service determination circuit, configured to determine a target microservice corresponding to the client device if the authentication of the client device's identity is successful; and a target service provision circuit, configured to provide the client device with the target microservice via a target application programming interface corresponding to the target microservice;

a registration request reception circuit, configured to receive registration requests transmitted by a plurality of microservices, the registration requests comprising registration addresses of the microservices, and the target microservice being one of the plurality of microservices;

a programming interface configuration circuit, configured to configure a corresponding application programming interface for each of the microservices based on a corresponding one of the registration requests, the target application programming interface being one of the application programming interfaces; and a microservice registration circuit, configured to complete the registration of each of the microservices in the gateway system based on a corresponding one of the registration addresses and a corresponding one of the application programming interfaces.

11. The gateway system according to claim 10, further comprising:

a service request acquisition circuit, configured to acquire a service request for applying for a microservice transmitted by the client device via the target application programming interface;

a target service acquisition circuit, configured to acquire the target microservice corresponding to the target application programming interface;

an authentication credential creation circuit, configured to create a gateway identity authentication credential corresponding to the client device, the gateway identity authentication credential comprising a public key and a private key assigned to the client device;

a public key transmission circuit, configured to transmit the public key to the client device; and an association relationship establishment circuit, configured to establish and store an association relationship between the target microservice and the private key.

12. The gateway system according to claim 11, wherein the identity authentication credential is a public key to be authenticated, and the identity authentication circuit comprises:
a first matching result acquisition sub-circuit, configured to match the public key to be authenticated and the private key which has been stored in advance to obtain a matching result; and
an identity authentication sub-circuit, configured to authenticate the client device's identity based on the matching result.

13. The gateway system according to claim 12, further comprising:
a validity period setting circuit configured to set a validity period of the gateway identity authentication credential; and
the first matching result acquisition sub-circuit comprising:
a validity period determination sub-circuit, configured to determine whether the validity period of the gateway identity authentication credential has elapsed; and
a second matching result acquisition sub-circuit, configured to match the public key to be authenticated and the private key to obtain the matching result if the validity period of the gateway identity authentication credential has not elapsed.

14. The gateway system according to claim 11, wherein the target service determination circuit comprises a target service determination sub-circuit configured to determine the target microservice corresponding to the private key based on the association relationship.

15. The gateway system according to claim 10, further comprising:
an access failure information transmission circuit configured to return information indicating failed access to the client device if the authentication of the client device's identity fails.

16. The gateway system according to claim 10, wherein the gateway system is a Kong gateway system, which is an agent tool for managing application programming interfaces and microservices, developed based on Nginx using a lua scripting language.

17. The gateway system according to claim 10, wherein the registration address is a media access control (MAC) address of the microservice.

18. The gateway system according to claim 10, wherein the public key is a user name assigned by the gateway system to the client device, and the private key is a password assigned by the gateway system to the client device.

* * * * *